United States Patent [19]

Metlitsky et al.

[11] Patent Number: 5,783,813
[45] Date of Patent: Jul. 21, 1998

[54] LIMITED WORKING RANGE SCANNER HAVING FOCUSED LIGHT BEAM WAIST SITUATED WITHIN SCANNER HOUSING

[75] Inventors: Boris Metlitsky; Paul Dvorkis. both of Stony Brook; Edward Barkan. Miller Place. all of N.Y.

[73] Assignee: Symbol Technologies, Inc.. Holtsville. N.Y.

[21] Appl. No.: 769,937

[22] Filed: Dec. 19, 1996

Related U.S. Application Data

[62] Division of Ser. No. 642,670, May 3, 1996, abandoned, which is a division of Ser. No. 419,916, Apr. 11, 1995, abandoned, which is a division of Ser. No. 28,107, Mar. 8, 1993, Pat. No. 5,408,081, which is a continuation-in-part of Ser. No. 721,951, Jun. 27, 1991, abandoned, which is a division of Ser. No. 510,074, Apr. 13, 1990, Pat. No. 5,059,779, which is a continuation-in-part of Ser. No. 367,335, Jun. 16, 1989, Pat. No. 5,124,539.

[51] Int. Cl.⁶ .................................................. G06K 7/10
[52] U.S. Cl. ........................................ 235/472; 235/462
[58] Field of Search ................................. 235/472. 462. 235/467

[56] References Cited

U.S. PATENT DOCUMENTS

| 5,140,144 | 8/1992 | Shepard et al. ............... 235/467 X |
| 5,200,597 | 4/1993 | Eastman et al. ............... 235/467 X |
| 5,408,081 | 4/1995 | Barkan ............................. 235/462 |

FOREIGN PATENT DOCUMENTS

| 0378766 | 7/1990 | European Pat. Off. . |
| 0498366 | 8/1992 | European Pat. Off. . |

Primary Examiner—Donald T. Hajeo
Assistant Examiner—Michael G. Lee
Attorney, Agent, or Firm—Kirschstein. et al.

[57] ABSTRACT

An electro-optical triggerless reader reads indicia having parts of different light reflectivity within a limited working range of distances relative to the reader. A light beam is focused to have its minimum beam cross-section, as considered along a scan direction. or waist situated within a housing for the reader, thereby enabling the reader to read indicia located adjacent the reader housing.

12 Claims, 6 Drawing Sheets

LIMITED WORKING RANGE SCANNER HAVING FOCUSED LIGHT BEAM WAIST SITUATED WITHIN SCANNER HOUSING

CROSS-REFERENCE TO RELATED APPLICATIONS

This application is a division of U.S. Ser. No. 08/642,670, filed May 3, 1996, now abandoned, which is a division of U.S. Ser. No. 08/419,916, filed Apr. 11, 1995, now abandoned, which is a division of U.S. Ser. No. 08/028,107, filed Mar. 8, 1993, which issued as U.S. Pat. No. 5,408,081, which is a continuation-in-part of U.S. Ser. No. 07/721,951, filed Jun. 27, 1991, now abandoned, which is a division of U.S. Ser. No. 07/510,074, filed Apr. 13, 1990, which issued as U.S. Pat. No. 5,059,779, which is a continuation-in-part of U.S. Ser. No. 07/367,335, filed Jun. 16, 1989, now U.S. Pat. No. 5,124,539.

BACKGROUND OF THE INVENTION

1. Field of the Invention

This invention relates to a limited working range scanner having a light beam that is focused so that its beam waist is situated within the interior of a housing for the scanner.

2. Description of Related Art

Hand-held laser scanners are well known. See, for example, U.S. Pat. Nos. 4,387,297; 4,409,470 and 4,806,742 as being representative of the art. A stand-alone laser scanning workstation, for example, see U.S. Pat. No. 4,369,361, having built-in laser, scanning and sensor components is also known. It is also known to provide a so-called "dummy" stand or fixture on which a hand-held laser scanner is optionally supported when not being held or used by a human operator. Such dummy stands typically serve mainly as convenient tabletop mounts or equipment perches to provide ready access of the scanner to the operator. In some cases, for example, see U.S. Pat. No. 5,105,070, the dummy stand is useful in changing the direction of a laser beam emitted by the supported scanner.

Each of the aforementioned hand-held scanners utilizes a trigger which, when manually actuated, initiates scanning and reading of the indicia. It has recently been proposed to provide a so-called "triggerless" hand-held laser scanner where, instead of a manually-operated trigger, the scanner employs an extra infrared light emitting diode (LED) and complementary infrared sensor, both mounted in a front end or nose of the scanner. When the nose is positioned close to a symbol, light from the LED reflects therefrom and is detected by the sensor. Additional control circuitry on-board the scanner turns on the laser and scanning components in response to such detection in order to initiate scanning and reading of the symbol.

The working range of this triggerless scanner is therefore limited by the sensing range of the infrared scanner. A symbol placed beyond the range of the sensor cannot be scanned because the sensor will not turn on the laser and scanning components. Moreover, aside from the additional expense of the infrared LED and sensor, this triggerless sensing technique can be inconvenient to use. To read another symbol, or to read the same symbol again, the scanner must be moved away from the symbol beyond the sensing range (e.g. about 15 cm) and then returned to be again positioned within sensing range. This can require large, tiring hand motions. In addition, the triggerless scanner is subject to many false reading attempts since any object positioned near the nose will turn the scanner on and, of course, this can include objects which bear no symbol.

SUMMARY OF THE INVENTION

1. Objects of the Invention

It is an object of this invention to limit the working range of an electro-optical reader by focusing its light beam so that its beam waist is situated within the reader.

2. Features of the Invention

In keeping with these objects, and others which will become apparent hereinafter, one feature of this invention resides, briefly stated, in a system for and a method of reading coded indicia lying within a limited range of working distances. The invention includes a housing having an interior and an exit window through which a light beam is directed, and a scanner for scanning the light beam in a scan direction across the indicia.

When a trigger is not provided on the reader, thereby constituting a so-called "triggerless" scanner, this invention proposes limiting the working range thereof by focusing the light beam to have its beam waist located within the interior of the reader. The beam waist has a minimum beam cross-section, as considered along a scan direction along which each indicia extends. The working range is limited by virtue of the distance traversed by the light beam within the reader between the beam waist and the exit window through which the light beam passes en route to the indicia. Only indicia within the limited working range can be read. No extra LED or sensor is required.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
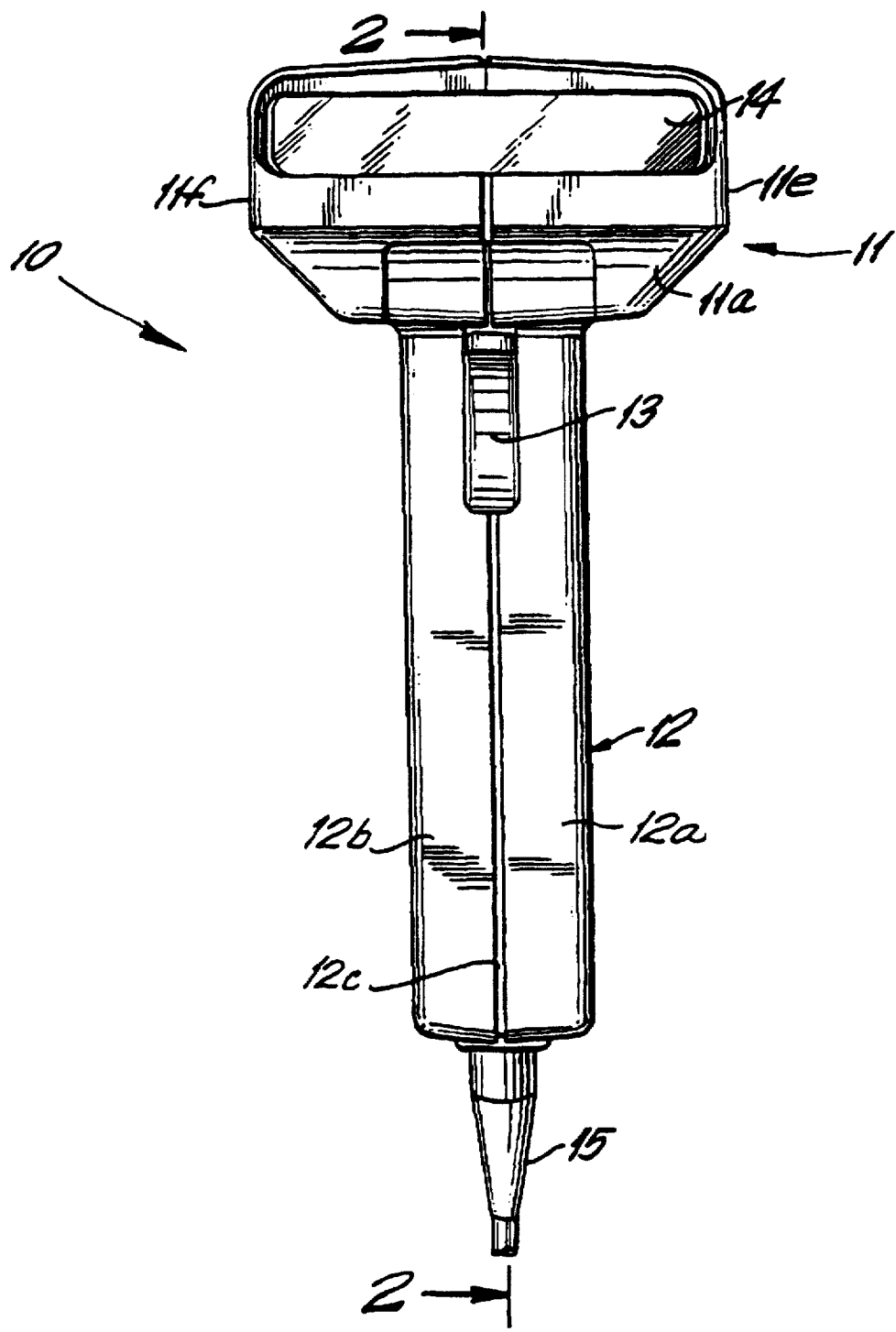
FIG. 1 is a front elevational view of a hand-held scanner.

Referring first to FIGS. 1–4 of the drawings, reference numeral 10 generally identifies a lightweight (less than one pound), hand-held laser scanner supportable entirely by a user for use in a laser scanning system operative for reading, scanning and/or analyzing coded indicia, and aimable both prior to, and during, the reading thereof, by the user at the indicia, each in its turn. The term "indicia" or "symbol", as used interchangeably herein, is intended to cover indicia composed of different portions having different light-reflective properties at the wavelength of the light source, e.g. a laser, being utilized. The indicia may be the omnipresent Universal Product Code (UPC) bar code symbol, or any of the black and white industrial symbols, e.g. Code 39, Codabar, Interleaved 2 of 5, etc. The indicia may also be any alphabetic and/or numeric characters. The term "symbol" is also intended to cover indicia located in a background field, wherein the indicia, or at least a portion thereof, have a different light-reflectivity property than that for the background field. In this latter definition, the "reading" of the symbol is of particular benefit in the fields of robotics and object recognition.

Turning now to FIG. 1, the scanner 10 includes a generally gun-shaped housing having a handle portion 12 of generally rectangular cross-section and generally elongated along a handle axis, and a generally horizontally-elongated barrel or body portion 11. The cross-sectional dimension and overall size of the handle portion 12 is such that the scanner conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the housing. The shell is formed of two housing parts 12a, 12b, meeting along a generally vertical joining line 12c.

Figure 4:
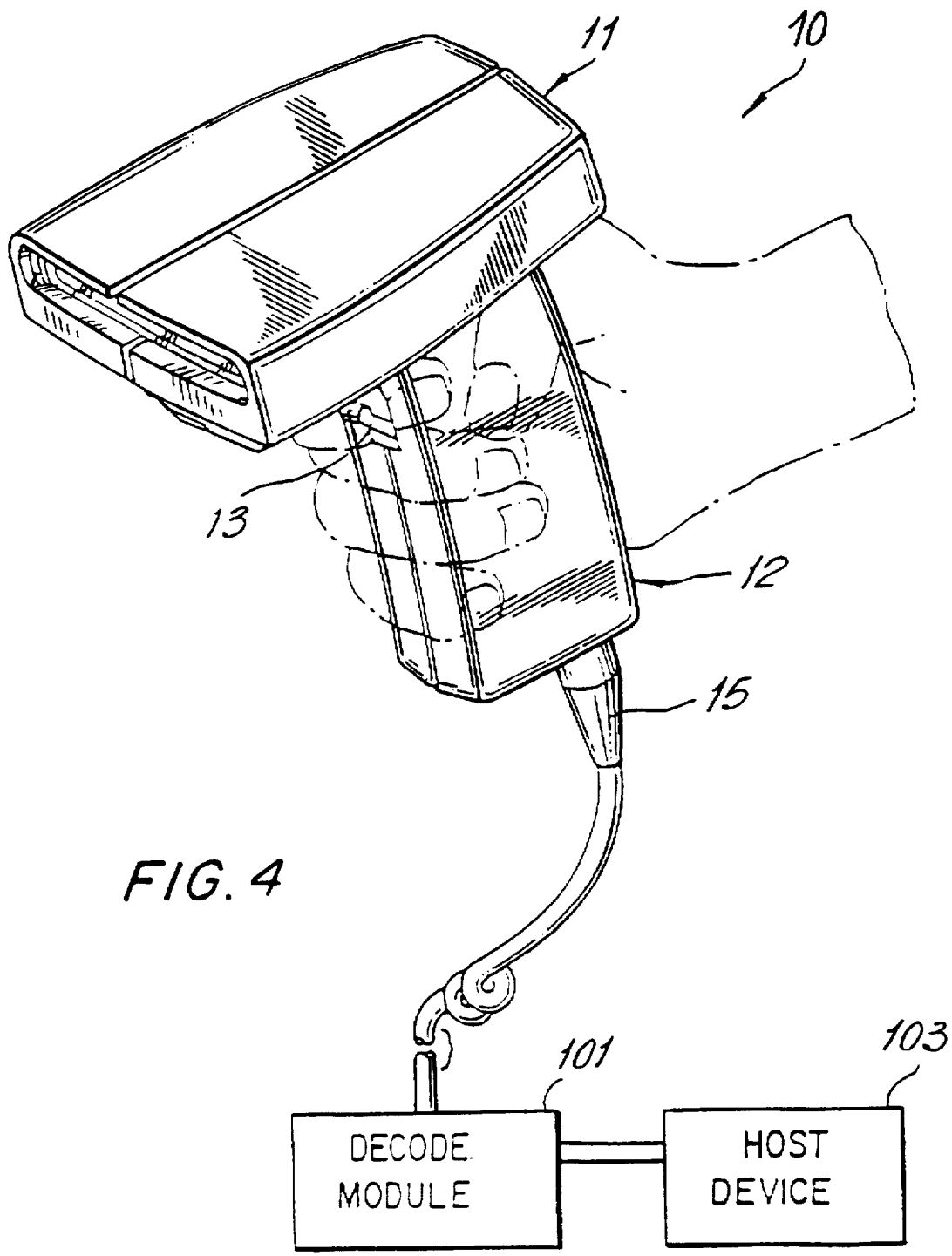
FIG. 4 is a perspective view of the scanner of FIG. 1 in one intended position of use.

As considered in one intended position of use, i.e. as a hand-held scanner as shown in FIG. 4, the body portion 11 has a front prow region or nose having an inclined front wall 11a. The body portion 11 also has a rear region or stern having a rear wall 11b spaced rearwardly of the inclined front wall 11a. The body portion 11 also has a top wall 11c, a bottom wall lid below the top wall 11c, and a pair of opposed side walls 11e, 11f between the top and bottom walls. The front wall 11a is sloped relative to the top and bottom walls.

A manually-actuatable, and preferably depressible, trigger 13 is mounted on a cantilever resilient arm 13a for movement relative to the housing in a forwardly-facing region where the handle and body portions meet and where the user's forefinger normally lies when the user grips the handle portion in the intended position of use. The bottom wall lid has a lower opening, and the handle 12 has a forwardly-facing slot through which the trigger 13 projects and is moved. The arm 13a has one end overlying a trigger switch 25 which is switched from an open to a closed state upon depression of the trigger 13.

An exit window 14 is stationarily mounted at the nose and is light-transmissive to allow laser light to pass from the interior to the exterior of the housing, and vice versa.

A flexible, non-bulky, coil-type electrical cable 15 with multiple freedoms of movement interconnects the scanner to the remainder of the components of the laser scanning system, whose operation is explained in greater detail below.

A plurality of components are mounted in the scanner and, as explained below, at least some of them are actuated by the trigger 13, either directly or indirectly, by means of a control microprocessor. One of the components is an actuatable laser light source (see FIGS. 3, 5 and 6), e.g. a semiconductor laser diode 33, operative, when actuated by the trigger 13, for propagating and generating an incident laser beam whose light is visible or at least marginally visible to the human eye. The emitted laser diode beam is highly divergent; diverges differently in different planes parallel and perpendicular to the longitudinal direction of beam propagation; is non-radially symmetrical, i.e. anamorphic; and has a beam cross-section generally resembling an oval. The diode may be of the continuous wave or pulse type. The diode requires a low voltage (e.g. 12 v DC or less) supplied by a power regulator and a battery (DC) source which may be provided within the scanner, or by a re-chargeable battery pack accessory detachably mounted on the scanner, or by a power conductor in the cable 15 connected to the scanner from an external power supply (e.g. DC source).

Figure 5:
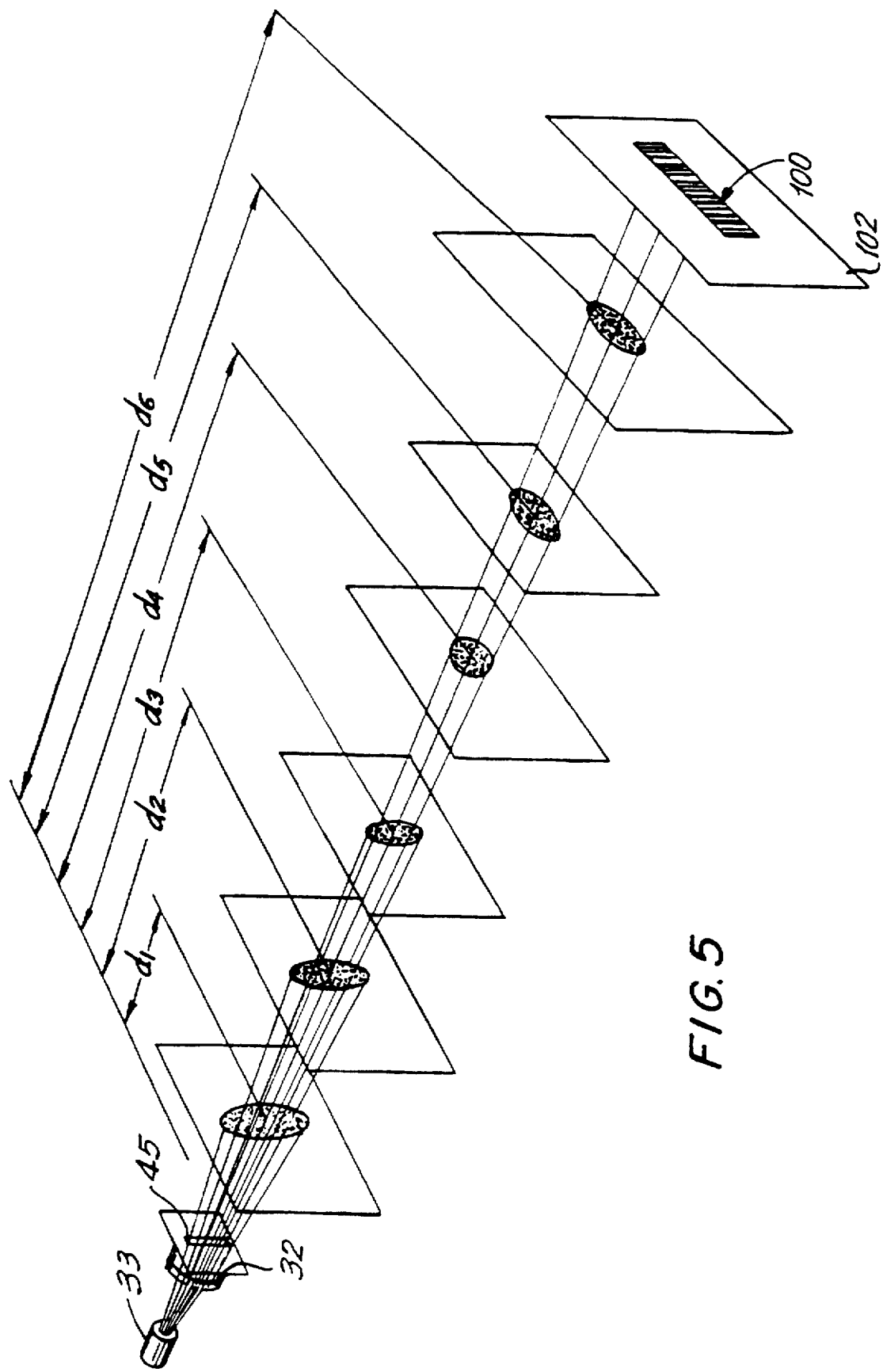
FIG. 5 is a perspective view of an optical assembly used in the scanner of FIG. 1, and shows beam cross-sections in enlarged view.
Figure 6:
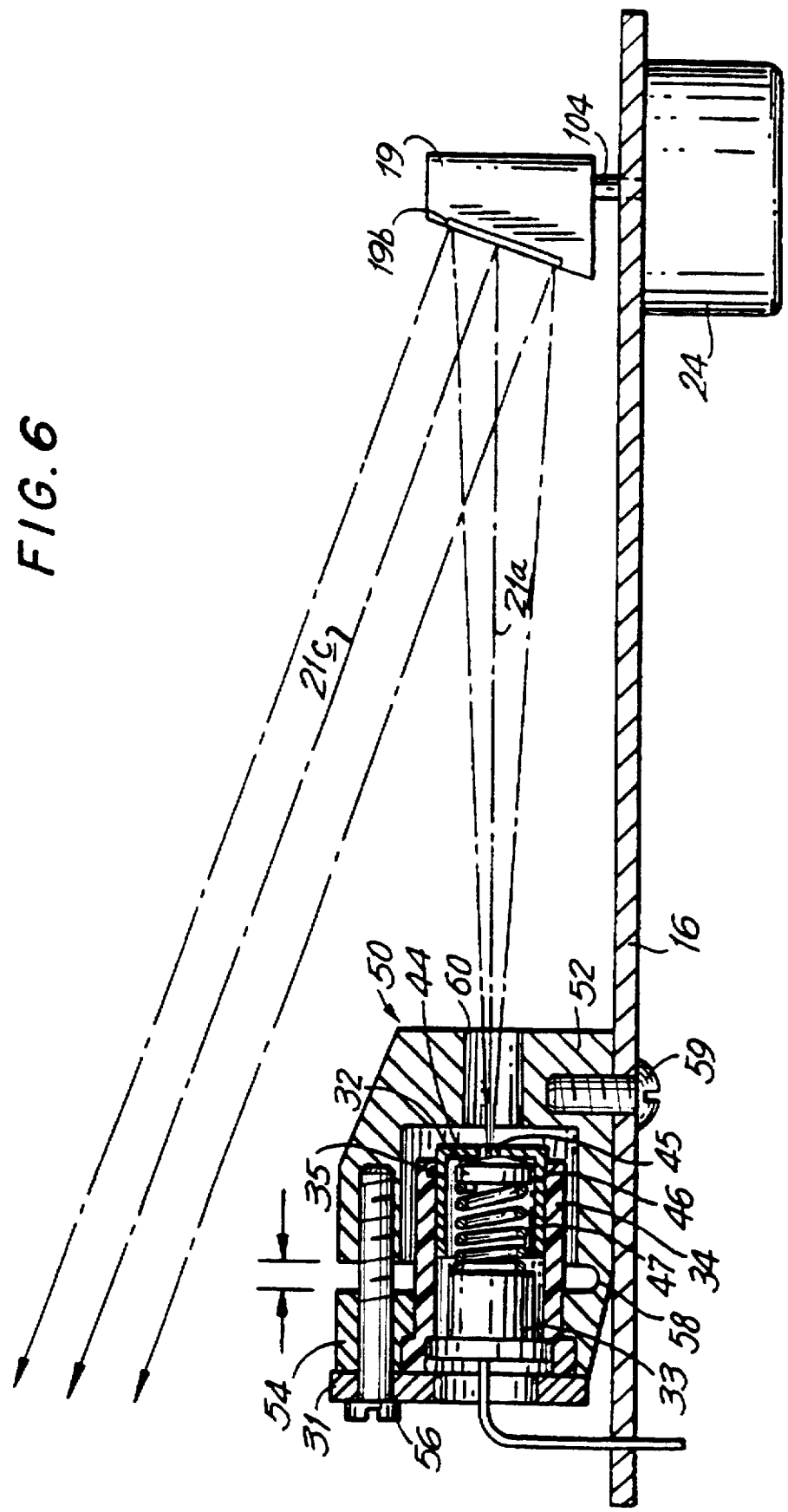
FIG. 6 is an enlarged, sectional view of part of the optical assembly of the scanner of FIG. 1.

As best shown in FIG. 6, an optical assembly 30 is mounted in the scanner on a thin, printed circuit board 16 and adjustably positioned relative to the same for optically modifying, i.e. focusing, and directing the emitted laser beam along a first optical path 21a, 21c toward a reference plane which is located exteriorly of the head, either at the nose for reading symbols in contact with the front wall 11a, or forwardly of the nose for reading symbols out of contact with the front wall 11a. The reference plane lies generally perpendicular to the longitudinal direction along which the emitted laser beam propagates. A symbol 100 (see FIG. 5) to be read is located in the vicinity of the reference plane, either at, or at one side, or at an opposite side, of the reference plane; that is, anywhere within the depth of field of the optically modified laser beam and within a range of working distances as measured relative to the scanner. The laser beam reflects off the symbol as a specular component in one direction and as a scattered component in many directions, and that portion of the scattered laser light which travels along a second optical path 21c and 21b away from the symbol back toward the scanner is known herein as the returning portion.

As best shown in FIG. 6, the optical assembly includes an elongated, cylindrical optical tube 34 having at one end region a cylindrical bore in which an annular casing portion of the diode 33 is snugly received to hold the diode in a fixed position, and at the opposite end region of the optical tube 34 a lens barrel 35 includes an aperture stop 45, blocking wall portions 44 surrounding and bounding the aperture stop, and cylindrical side wall portions 46 which bound an interior space.

The optical assembly further includes a focusing lens 32, e.g. a plano-convex lens, located within the interior space of the side wall portions 46 in the first optical path, and operative, together with the stop, for focusing the emitted laser beam to a beam waist (e.g. see position $d_2$ in FIG. 5) at the reference plane. The aperture stop 45 may be located on either side of the lens 32, but preferably on the downstream side. A biasing means or tensioned coil spring 47 is located within the optical tube, and has one coil end bearing against a casing portion of the diode, and another coil end bearing against a planar side of the lens 32. The spring constantly urges the lens against the blocking wall portions, thereby fixedly locating the lens relative to the aperture stop. The lens and aperture stop are jointly moved when the lens barrel is longitudinally moved.

The aperture stop has a cross-section which is, as explained below, generally about equal to the cross-section of the emitted laser beam at the aperture stop, thereby permitting a major portion of the emitted laser beam to pass through the aperture stop downstream along the first optical path en route to the symbol. The aperture stop cross-section preferably is rectangular or oval, in which case, the longer dimension of the rectangular or oval cross-section is aligned with the larger divergence of the laser beam to transmit more energy to the symbol. The optical assembly includes an optical block 50 having a front portion 52 and a rear portion 54 together bounding an interior in which the diode 33, optical tube 34, lens barrel 35 and the aforementioned components contained therein are received. A heat sink 31 is mounted in intimate thermal contact with the diode to conduct heat away from the same. An elevation adjustment means, including at least one threaded element 56, passes with clearance through aligned holes formed respectively in the heat sink and the rear portion 54, and is threaded into a threaded bore formed in the front portion 52. A hinge 58 is advantageously realized by providing a thin, flexible, weakened zone in the optical block between the front and rear portions thereof. The front portion 52 is stationarily mounted on the board 16 by anchors 59. The diode, tube, barrel and the components contained therein are mounted on the rear portion for movement therewith. Upon turning the element 56 in either circumferential direction about an axis along which the element 56 extends, the rear portion and all the components supported thereon will be angularly moved about the hinge 58 relative to the stationary front portion, thereby raising or lowering the emitted light beam which exits the block 50 through a clearance passage 60 which is dimensioned so as not to block the beam throughout its angular range of adjustment.

The laser beam that passes through the passage 60 is directed rearwardly by the optical assembly along path 21a within the scanner to a generally planar scanning mirror 19b for reflection therefrom. The scanning mirror 19b forwardly reflects the laser beam impinging thereon along path 21c through the forwardly-facing, laser-light-transmissive window 14 and to the symbol. As best shown in FIG. 5, the symbol 100 as shown in the vicinity of the reference plane 102 and, in the case of a bar code symbol, is comprised of a series of vertical bars spaced apart of one another along a longitudinal direction. A laser beam spot is focused on the symbol. When the scanning mirror is, as explained below, reciprocally and repetitively oscillated transversely to sweep the laser beam lengthwise across all the bars of the symbol, a single linear scan is generated. The linear scan can be located anywhere along the height of the bars provided that all the bars are swept. The length of the linear scan is longer than the length of the longest symbol expected to be read and, in a preferred case, the linear scan is on the order of 3 inches at the reference plane.

The scanning mirror 19b is mounted on a scanning means, preferably a high-speed scanner motor 24 of the type shown and described in U.S. Pat. No. 4,387,297, the entire contents of said patent being incorporated herein by reference and made part of the instant application. For the purposes of this application, it is believed to be sufficient to point out that the scanner motor 24 has an output shaft 104 on which a support bracket 19 is fixedly mounted. The scanning mirror is fixedly mounted on the bracket. The motor is driven to reciprocally and repetitively oscillate the shaft in alternate circumferential directions over arc lengths of any desired size, typically less than 360 degrees, and at a rate of speed on the order of a plurality of oscillations per second. In a preferred embodiment, the scanning mirror and the shaft jointly are oscillated so that the scanning mirror repetitively sweeps the laser diode beam impinging thereon through an angular distance or arc length at the reference plane of about 32 degrees and at a rate of about 40 scans or 20 oscillations per second.

Referring again to FIG. 2, the returning portion of the scattered component of the reflected laser light has a variable light intensity, due to the different light-reflective properties of the various parts that comprise the symbol 100, over the symbol during the scan. The returning portion of the reflected laser light is collected by a generally concave, spherical collecting mirror 19a, and is a broad conical stream of light in a conical collecting volume centered on path 21c. The collecting mirror 19a reflects the collected conical light into the head along path 21b through a laser-light-transmissive element 106 to a sensor means, e.g. a photosensor 17. The photosensor 17, preferably a photodiode, detects the variable intensity which extends along, and preferably beyond, the linear scan, and generates an electrical analog signal indicative of the detected variable light intensity.

The collecting mirror 19a is also mounted on the support bracket 19 and, when the scanning mirror is actuated by the trigger, the collecting mirror is reciprocally and repetitively oscillated transversely, sweeping the field of view of the photodiode lengthwise across the symbol in a linear scan.

The scanning mirror and the collecting mirror are, in a preferred embodiment, of one-piece construction, but the scanning mirror can also be a discrete, small, planar mirror attached by glue, or molded in place, at the correct position and angle on a discrete, front surfaced, reflectively coated, concave mirror. The concave collecting mirror serves to collect the returning portion of the laser light and to focus the same on the photodiode.

Also mounted in the head are various electrical subcircuits mounted on board 16. For example, signal processing means 38 on board 16 are operative for processing the analog electrical signal generated by the sensor, and for generating a digitized video signal. Data descriptive of the symbol can be derived from the video signal. Suitable signal processing means for this purpose was described in U.S. Pat. No. 4,251,798. Component 39 on board 16 constitutes drive circuitry for the scanner motor, and suitable motor drive circuitry for this purpose was described in U.S. Pat. No. 4,387,297. Component 40 on board 16 is a voltage converter for energizing the laser diode 33. The entire contents of U.S. Pat. Nos. 4,251,798 and 4,387,297 are incorporated herein by reference and made part of the instant application.

The digitized video signal is conducted, in one embodiment, along cable 15 to decode/control module or means 101 (see FIG. 4) operative for decoding the digitized video signal to a digitized decoded signal from which the desired data descriptive of the symbol is obtained, in accordance with an algorithm contained in a software control program. The decode/control means includes a PROM for holding the control program, a RAM for temporary data storage, and a control microprocessor for controlling the PROM and RAM. The decode/control means determines when a successful decoding of the symbol has been obtained, and also terminates the reading of the symbol upon the determination of the successful decoding thereof. The initiation of the reading is caused by depression of the trigger. The decode/control means also includes control circuitry for controlling the actuation of the actuatable components in the head, as initiated by the trigger, as well as for communicating with the user that the reading has been automatically terminated as, for example, by sending control signals to indicator lamps 36, 37 (see FIG. 3) to illuminate the same.

The decoded signal is conducted to a remote, host computer 103 which serves essentially as a large data base, stores the decoded signal and, in some cases, provides information related to the decoded signal. For example, the host computer can provide retail price information corresponding to the objects identified by their decoded symbols.

In another embodiment, the decode/control means and a local data storage means are mounted on another printed circuit board 27 in the handle portion, and store multiple decoded signals which have been read. The stored signals thereupon can be down-loaded to a remote host computer. By providing the local data storage means, the use of the cable during the reading of the symbols can be eliminated—a feature which is very desirable in making the head as freely manipulatable as possible. A beeper 28 is also optionally mounted on board 27 so that the user can hear through a port 29 in the handle when a symbol has been successfully read. A battery pack is also mounted on the handle portion.

Figure 2:
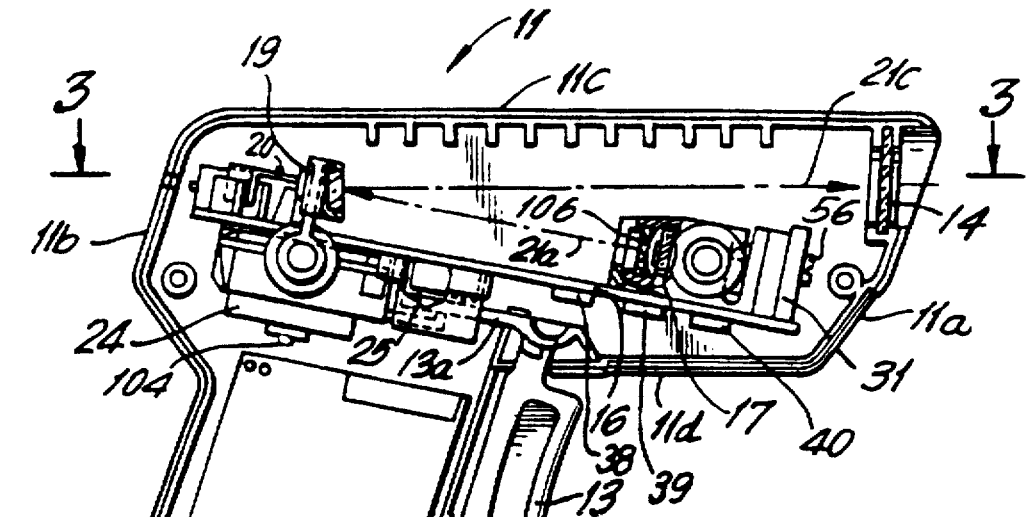
FIG. 2 is a sectional view taken on line 2—2 of FIG. 1.
Figure 3:
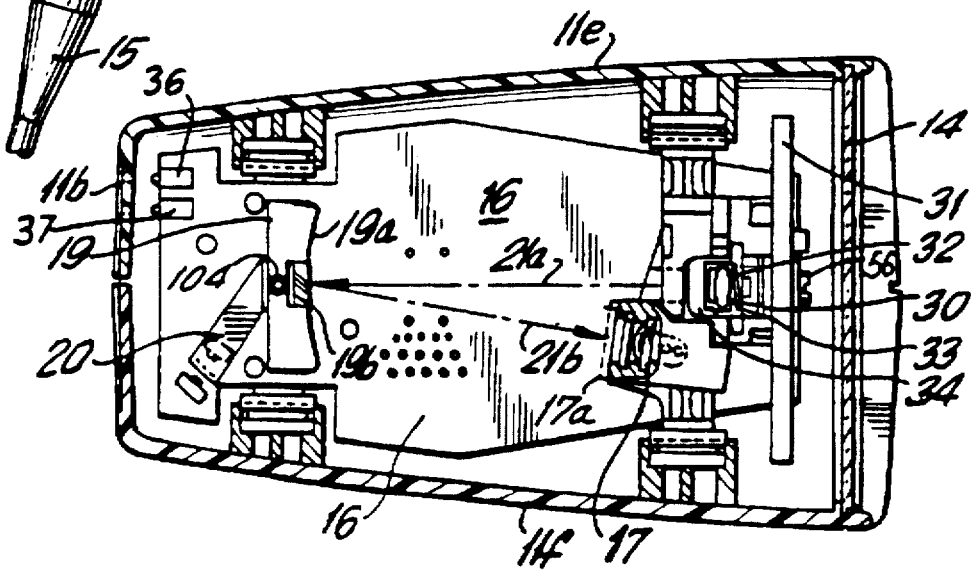
FIG. 3 is a sectional view taken on line 3—3 of FIG. 2.
Figure 7:
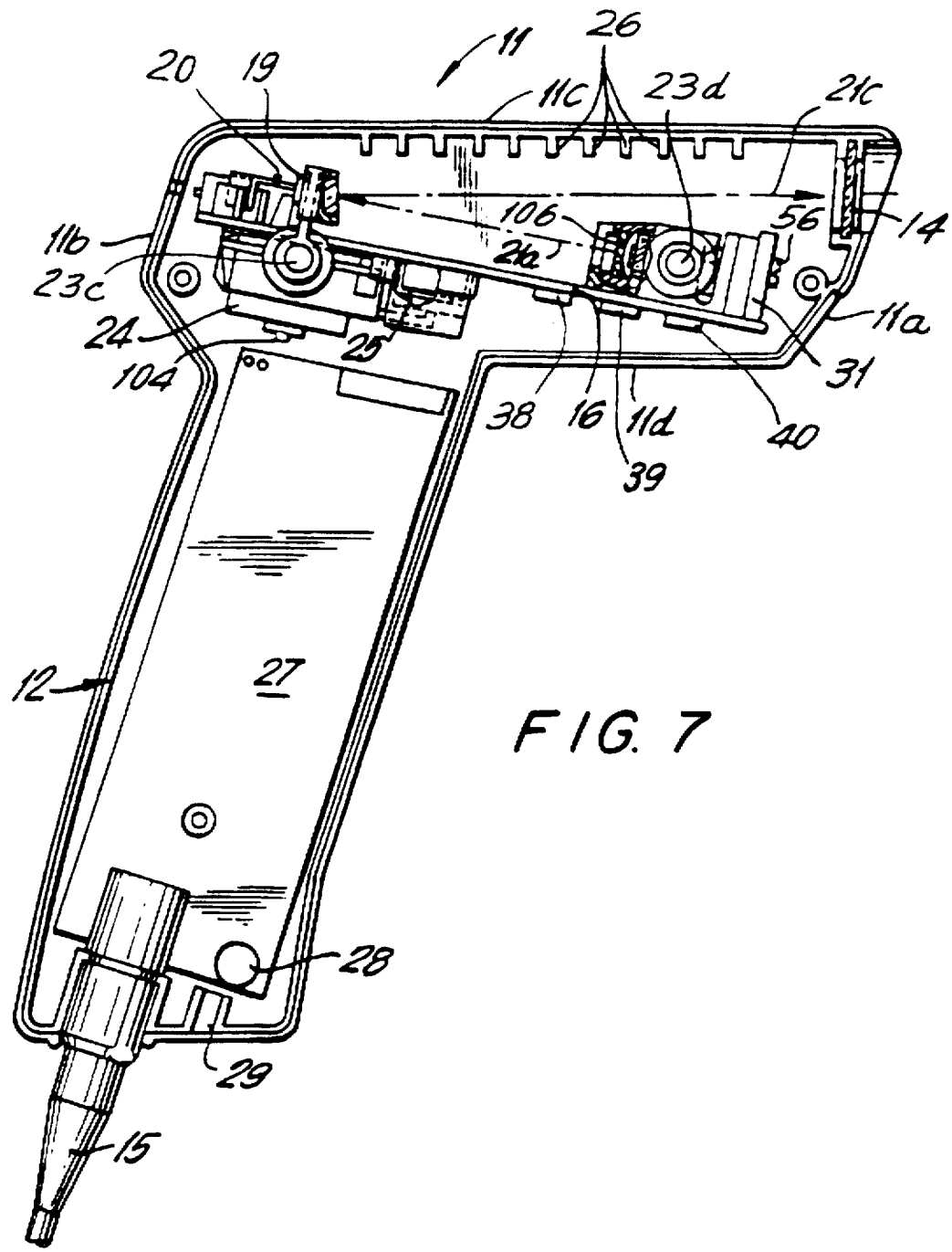
FIG. 7 is a view analogous to FIG. 2, but of a triggerless scanner.

The triggerless scanner shown in FIG. 7 is structurally similar to the scanner shown in FIG. 2, except principally for the lack of a manual pull-type trigger. In the triggerless scanner, working range is limited by designing the optical assembly to focus the laser in an untraditional way.

As shown in FIG. 5 the focusing lens 32 and the aperture stop 45, which comprise the optical assembly, focus the emitted beam to have various cross-sections at distances $d_1$, $d_2$, $d_3$, $d_4$, $d_5$ and $d_6$. As considered along the scan direction, i.e. horizontally across the symbol, the beam cross-section decreases to a minimum at distance $d_3$, and increases to a maximum at distance $d_6$. As considered along the non-scan direction, i.e. vertically, the beam cross-section increases to a maximum at distance $d_3$, and decreases to a minimum at distance $d_6$. The minimum cross-section at distance $d_3$ is termed the beam waist, and is the ideal spot to position the symbol 100 for reading purposes. The symbol could be positioned anywhere in the range of distances $d_1$ through $d_6$, and this constitutes the working range of the scanner.

In all prior laser scanners, the laser is focused so that the beam waist is within the working range, but outside of the scanner housing. The waist size is chosen so as to permit reading of the highest density bar code symbols that the scanner is intended to read, when these symbols are placed at or near the beam waist.

In the triggerless scanner, according to this invention, the beam waist is located within the scanner housing, where a symbol cannot be located. The waist size is significantly smaller than what is needed to read high density symbols. By the time the beam reaches the nose of the scanner, it has grown to a size appropriate for high density symbols. The beam continues to grow very rapidly, due to the very small waist size, until it is too big to read any symbols of common density at only a few inches beyond the nose. For example, a prototype scanner can read 5 mil symbols to about 0.25 inches, 13 mil symbols to about 1.25 inches, and 26 mil symbols to about 2.5 inches. The limited working range avoids the prior art need for large, tiring hand motions to read successive symbols.

This is quite economical as no sensing circuitry is needed, as in the prior art. Laser focusing is also facilitated because the very small waist size means that a low magnification, i.e. less than 10×, focusing system can be used, which is easy to focus.

Since there is no sensor to turn on the laser 33 and scan motor 24 when a symbol is placed near the scanner, it would be desirable to leave the motor and laser running all the time, so that any symbol that comes within scanning range can be immediately decoded. However, this can cause an unacceptable amount of heat to be generated within the scanner housing. The laser, which is the largest heat generator in the scanner, is also the most heat sensitive and shortest-lived component in the scanner. It is therefore important that the laser be turned on only when it is needed. There are several ways laser on-time can be minimized.

The laser can be switched on and off at a high frequency (several times in the time it takes for a beam spot to traverse a bar width). This is a well-known means of reducing laser power consumption. Another way is to turn on the laser only when the decode module 101 is ready to accept new data. This takes advantage of the fact that the microprocessor 160 in the decode module spends part of its time loading data (when the laser is needed) and part of its time evaluating the data that was just loaded (when the laser is not needed). The evaluating (or processing) time can account for from 15% to 50% of a scan time, depending on the symbol being scanned.

Another way to reduce laser on-time is to turn it off during the overscan period. Overscan is the time when the motor angle is such that the laser beam is directed past one end or the other of the scan window, so that it would hit the inside of the housing, not the symbol. The microprocessor 160 can control this by turning off the laser for a short time on either side of a start of scan transition. Start of scan is a signal from the motor drive circuit that indicates that the scan motor direction is changing, to begin a new scan.

After a decode, or if no symbol has been detected for a period of time, the laser can be turned on only occasionally, for example, every other scan, until a symbol is detected. If the decode microprocessor thinks there may be a decodable symbol within range, it can turn on the laser every scan, or whenever it is ready to load scan data until the symbol is decoded, at which time, it will return to the mode of turning on the laser only occasionally.

If the decoder thinks there is a symbol present, causing it to go into the "every scan" mode, but it fails to decode after a predetermined amount of time (for example, two seconds), it will go back to the occasional scan mode until it thinks something new has been presented.

If no new symbols have been decoded after a predetermined amount of time, the duty cycle of the occasional scan mode can be decreased, in several steps if desired. The laser can be blinked every other scan. If nothing is decoded for five minutes, the laser will be on only every third scan. After 15 minutes, it can be every fifth scan. This will minimize laser on-time in environments where the scanner is only occasionally used, or if people leave it powered up when they go home at night, but aggressiveness, which will degrade at low duty cycles, will be maintained in heavy use environments.

If desired, the exact duty cycles and times at which they are enabled can be programmed by the user by bar code menu, or over a scanner-to-host interface.

The laser on-time limiting techniques mentioned above are best implemented if the scan motor 24 runs continuously. Therefore, it is important to have a very long-lived motor, as it may have to run continuously for years. It is also important for the motor to use a minimum amount of power so that it does not heat the interior at the scanner which would shorten the laser's life. A resonant motor is ideal for this, and one such motor was described in pending U.S. patent application Ser. No. 812,938, filed Dec. 24, 1991.

Another way to limit the working range uses a laser that is focused to provide a working range that is longer than would usually be convenient for a triggerless scanner. Range, in this case, is limited by decode software. The decoder can be programmed to reject symbols that look too small (symbols further away look smaller to the decoder because the spot speed is higher). The working range will now be under software control, which means that it can be varied to suit the particular application. For example, it can be set to six inches for scan fixture operation, or for one inch for reading menus. It can even read different symbologies or specially encoded symbols at different distances.

It will be understood that each of the elements described above, or two or more together, also may find a useful application in other types of constructions differing from the types described above.

While the invention has been illustrated and described as embodied in a a triggerless scanner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A triggerless reader for electro-optically reading coded indicia within a limited working range of distances relative to the reader, comprising:

(a) a housing having an interior and an exit window;

(b) a light source in the housing for emitting and directing a light beam along an optical path through the window toward indicia to be read;

(c) scanner means in the housing for scanning the light beam in a scan direction across the indicia; and (d) optical means in the housing for focusing the light beam to have a beam waist located within said interior of the housing, said beam waist having a minimum beam cross-section as considered along the scan direction, said beam waist being positioned in the optical path between the light source and the window to limit the working range by virtue of the distance traversed by the light beam within the housing.

2. The triggerless reader according to claim 1; and further comprising control means for continuously operating at least one of the light source and the scanner means.

3. The triggerless reader according to claim 1; and further comprising control means for intermittently operating at least one of the light source and the scanner means.

4. The triggerless reader according to claim 3, wherein the control means operates at least one of the light source and the scanner means according to a set of predetermined criteria.

5. The triggerless reader according to claim 4; wherein the control means deactivates the light source during part of each scanning across the indicia.

6. The triggerless reader according to claim 1, wherein the optical means includes a focusing lens and an aperture stop.

7. The triggerless reader according to claim 1, wherein the optical means has a low magnification less than ten.

8. The triggerless reader according to claim 1, wherein the housing has a handle.

9. A method of electro-optically reading coded indicia within a limited working range of distances with a triggerless reader, comprising the steps of:

(a) emitting and directing a light beam along an optical path through an exit window of a housing having an interior;

(b) scanning the light beam in a scan direction across indicia located externally of the housing; and (c) focusing the light beam to have a beam waist located within said interior of the housing, said beam waist having a minimum beam cross-section as considered along the scan direction, said working range being limited by virtue of the distance along the optical path traversed by the light beam between the beam waist and the exit window.

10. The method according to claim 9; and further comprising controlling the performance of at least one of steps (a) and (b) according to a set of predetermined criteria.

11. The method according to claim 10, wherein the controlling step is performed by intermittently performing steps (a) and (b).

12. The method according to claim 9, wherein the focusing step is performed by an optical train whose magnification is less than ten.

* * * * *